(12) United States Patent
Bartal et al.

(10) Patent No.: US 11,105,746 B2
(45) Date of Patent: Aug. 31, 2021

(54) MULTI MOIRE STRUCTURED ILLUMINATION MICROSCOPY WITH HIGH INDEX MATERIALS

(71) Applicant: TECHNION RESEARCH & DEVELOPMENT FOUNDATION LIMITED, Haifa (IL)

(72) Inventors: Guy Bartal, Atlit (IL); Bergin Gjonaj, Haifa (IL); Yacob Yochai Blau, Haifa (IL); Doron Shterman, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 49 days.

(21) Appl. No.: 16/318,500

(22) PCT Filed: Jul. 18, 2017

(86) PCT No.: PCT/IL2017/050806
§ 371 (c)(1),
(2) Date: Jan. 17, 2019

(87) PCT Pub. No.: WO2018/015950
PCT Pub. Date: Jan. 25, 2018

(65) Prior Publication Data
US 2019/0227293 A1 Jul. 25, 2019

Related U.S. Application Data

(60) Provisional application No. 62/364,355, filed on Jul. 20, 2016.

(51) Int. Cl.
*G02B 21/06* (2006.01)
*G02B 21/14* (2006.01)
(Continued)

(52) U.S. Cl.
CPC ....... *G01N 21/648* (2013.01); *G01N 21/6456* (2013.01); *G01N 21/6458* (2013.01);
(Continued)

(58) Field of Classification Search
CPC ............ G02B 21/0004; G02B 21/0032; G02B 21/0052; G02B 21/0056; G02B 21/006;
(Continued)

(56) References Cited

U.S. PATENT DOCUMENTS 6,255,642 B1 7/2001 Cragg et al.
7,280,184 B2 * 10/2007 Hasegawa ........... G03F 7/70258
355/53

(Continued)

OTHER PUBLICATIONS

A. Haynie et al., High accuracy subwavelength distance measurements: a variable-angle standing-wave total-internal-reflection optical microscope, J. Appl. Phys. 105, 084704 (2009).*

(Continued)

*Primary Examiner* — Allen C. Ho
(74) *Attorney, Agent, or Firm* — The Roy Gross Law Firm, LLC; Roy Gross

(57) ABSTRACT

A system comprising: a high index dielectric configured to: a) create a bi-periodic interference pattern of two standing sinusoidal waves on illumination by two pairs of counter-propagating sinusoidal light beams at different incident angles, wherein the incident angles are selected in accordance with the index of refraction of the high index dielectric to i) to 5 determine the spatial frequency of each counter-propagating light beam pair, and ii) cause total internal reflection, and b) generate, from the bi-periodic interference pattern, an evanescent bi-periodic standing sinusoidal wave; a light source configured to illuminate the high index dielectric with the two pairs of counter-propagating sinusoidal light beams at the different incident angles and thereby illuminate a fluorescing object positioned at the (Continued)

surface of the high index dielectric with the generated evanescent bi-periodic standing sinusoidal wave; and one or more delay lines configured to independently modify the initial phase of each counter-propagating light beam pair.

19 Claims, 15 Drawing Sheets

(51) Int. Cl.
  *G02B 21/36*   (2006.01)
  *G01N 21/64*   (2006.01)
  *G02B 21/08*   (2006.01)
  *G02B 21/34*   (2006.01)
  *G02B 21/00*   (2006.01)
  *G02B 21/16*   (2006.01)

(52) U.S. Cl.
  CPC ....... *G02B 21/0004* (2013.01); *G02B 21/006* (2013.01); *G02B 21/0032* (2013.01); *G02B 21/0052* (2013.01); *G02B 21/0056* (2013.01); *G02B 21/0064* (2013.01); *G02B 21/0076* (2013.01); *G02B 21/06* (2013.01); *G02B 21/086* (2013.01); *G02B 21/14* (2013.01); *G02B 21/16* (2013.01); *G02B 21/34* (2013.01); *G02B 21/367* (2013.01); *G02B 21/368* (2013.01); *G01N 2021/646* (2013.01); *G01N 2201/0635* (2013.01); *G01N 2201/0638* (2013.01); *G01N 2201/06113* (2013.01)

(58) Field of Classification Search
  CPC ....... G02B 21/0064; G02B 21/0076; G02B 21/06; G02B 21/086; G02B 21/14; G02B 21/16; G02B 21/34; G02B 21/367; G02B 21/368; G01N 21/6456; G01N 21/6458; G01N 2021/646; G01N 21/648; G01N 2201/06113; G01N 2201/0635; G01N 2201/0638

USPC .................................................. 250/330, 332
See application file for complete search history.

(56) References Cited

U.S. PATENT DOCUMENTS

| | | | | |
|---|---|---|---|---|
| 7,453,560 B2* | 11/2008 | Miyake | ................. | G03F 7/706 |
| | | | | 356/237.2 |
| 7,544,960 B2* | 6/2009 | Miyachi | ................. | B82Y 10/00 |
| | | | | 250/504 R |
| 8,155,409 B2* | 4/2012 | Cremer | ................. | B82Y 20/00 |
| | | | | 382/128 |
| 8,836,948 B2* | 9/2014 | Liu | ................. | G01B 9/04 |
| | | | | 356/445 |
| 9,103,784 B1* | 8/2015 | Sivasankar | ........ | G02B 21/0076 |
| 9,297,991 B2* | 3/2016 | Takahashi | .............. | G02B 21/26 |
| 9,404,867 B2* | 8/2016 | Kempe | ................. | G02B 21/16 |
| 10,268,033 B2* | 4/2019 | Sase | ................. | G01N 21/6458 |
| 10,401,300 B2* | 9/2019 | Otani | ................. | G01N 23/2251 |
| 2015/0043049 A1 | 2/2015 | Takahashi et al. | | |

OTHER PUBLICATIONS

Jan T. Frohn et al: "True optical resolution beyond the Rayleigh limit achieved by standing wave illumination", Proceedings of the National Academy of Sciences, Jun. 20, 2000, vol. 97, No. 13, pp. 7232-7236.
Yochai Blau et al: "Double moiré structured illumination microscopy with high-index materials", Optics Letter, Aug. 1, 2016, vol. 41, No. 15, pp. 3455-3458.
International Search Report PCT/IL2017/050806 Completed Nov. 16, 2017; dated Nov. 16, 2017 3 pages.
Written Opinion of the International Searching Authority PCT/IL2017/050806 dated Nov. 16, 2017 5 pages.

* cited by examiner

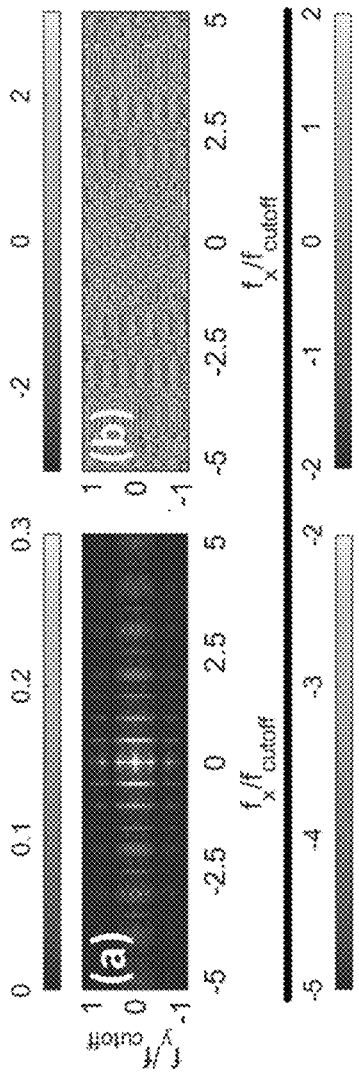
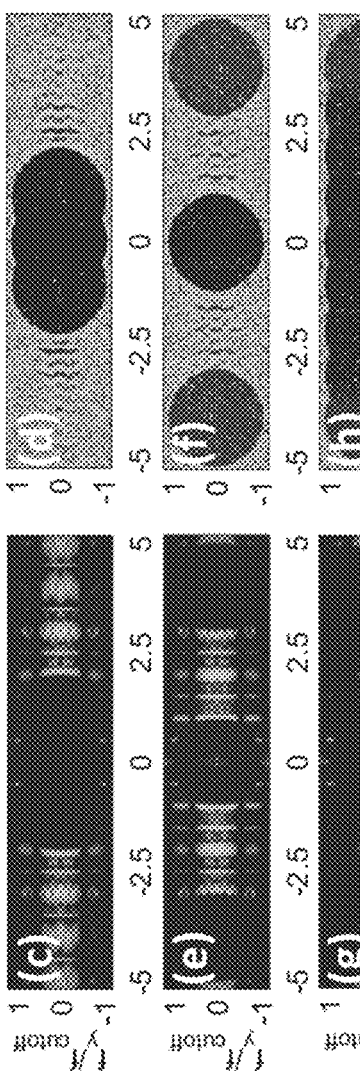
FIG. 4A  FIG. 4B  FIG. 4C  FIG. 4D  FIG. 4E  FIG. 4F  FIG. 4G  FIG. 4H

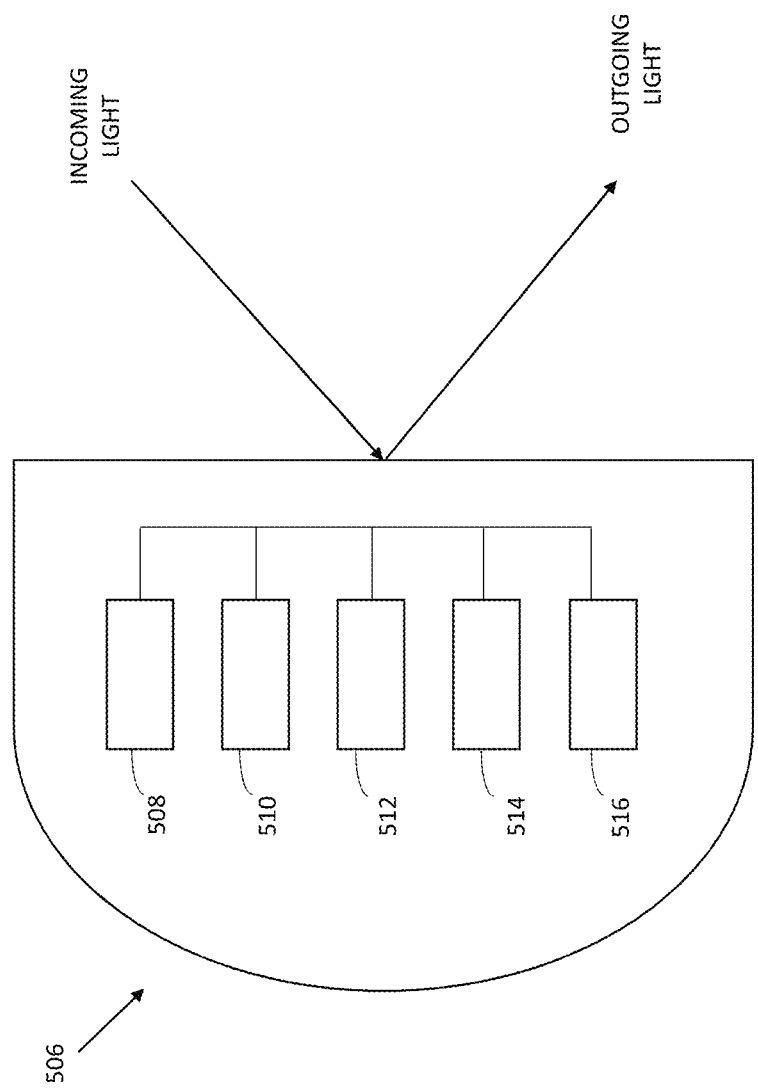

MULTI MOIRE STRUCTURED ILLUMINATION MICROSCOPY WITH HIGH INDEX MATERIALS

CROSS-REFERENCE TO RELATED APPLICATIONS

This application is a National Phase of PCT Patent Application No. PCT/IL2017/050806 having International filing date of Jul. 18, 2018, which claims the benefit of priority of U.S. Provisional Patent Application No. 62/364,355 filed Jul. 20, 2016, entitled: MULTI MOIRE STRUCTURED ILLUMINATION MICROSCOPY WITH HIGH INDEX MATERIALS. The contents of the above applications are all incorporated by reference as if fully set forth herein in their entirety.

BACKGROUND

The invention relates to the field of Structured Illumination Microscopy (SIM).

Fluorescence microscopy allows imaging living cells using visible light that is typically not harmful to most living samples. However, standard optical microscopy using visible light imposes an inherent resolution limit of roughly 200 nanometers (nm), whereas imaging intra-cellular structures typically requires achieving a resolution of sub 100 nm. Some super-resolution techniques, such as Stimulated Emission Depletion (STED) microscopy, Photoactivated Localization Microscopy (PALM, STORM), and Near-field Scanning Optical Microscopy (NSOM), have been able to achieve sub 50 nm resolution. However, these techniques require scanning which result in long acquisition times, and\or rely on high and potentially damaging light intensities such as X-rays that are destructive to living cells, restricting their use for dynamic in vivo studies.

Structured Illumination Microscopy (SIM) is a wide-field super-resolution technique which is fast and compatible with low-light intensities, and thus suitable for in vivo studies. However, the resolution of typical SIM techniques is roughly 100 nm, which is substantially lower than the resolution capability achieved using STED and/or PALM.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising: a dielectric configured to: create a bi-periodic interference pattern of two standing sinusoidal waves on illumination by two pairs of counter-propagating light beams at different incident angles, wherein the incident angles are selected in accordance with the index of refraction of the dielectric to i) determine the spatial frequency of each counter-propagating light wave pair, and ii) cause total internal reflection, and generate, from the bi-periodic interference pattern, an evanescent bi-periodic standing sinusoidal wave; an optical apparatus configured to produce the two pairs of counter-propagating sinusoidal light waves and illuminate the dielectric at the selected incident angles and thereby illuminate a fluorescing object positioned at the surface of the dielectric with the generated bi-periodic evanescent standing sinusoidal wave; and one or more delay lines configured to independently modify the initial phase of each counter-propagating light wave pair.

In some embodiments, the system further comprises a detector configured to detect multiple low resolution images emitted from the illuminated fluorescing object, wherein each image corresponds to a different one of the modified initial phases; and a processor configured to process the multiple low resolution images into spectra and reconstruct a high resolution image of the object.

In some embodiments, the system further comprises a display configured to render the reconstructed image.

In some embodiments, the detector is synchronized with the delay lines to automatically detect the emitted spectrum for each phase modification.

In some embodiments, the processor is further configured to: iii) control the delay lines thereby controlling the phase modification, and iv) perform the synchronizing step.

There is provided, in accordance with an embodiment, a method comprising: selecting two incident angles in accordance with the index of refraction of a dielectric to i) determine a spatial frequency of each of two counter-propagating light wave pairs, and ii) cause total internal reflection on illuminating the dielectric with the two counter-propagating light wave pairs at the two incident angles; illuminating the dielectric with the two pairs of counter-propagating light beams at the selected incident angles, thereby creating a bi-periodic interference pattern comprising two standing sinusoidal waves at the determined spatial frequencies, wherein the dielectric is configured to generate from the interference pattern an evanescent bi-periodic standing sinusoidal wave at the surface of the dielectric; illuminating a fluorescing object with the evanescent bi-periodic standing sinusoidal wave; and independently modifying the initial phase of each counter-propagating light wave pair.

In some embodiments, the method further comprises detecting multiple low resolution images emitted from the illuminated fluorescing object, wherein each image corresponds to a different one of the modified initial phases; and processing the multiple low resolution images into spectra to reconstruct a high resolution image of the object.

In some embodiments, the method further comprises displaying the reconstructed image.

In some embodiments, the method further comprises synchronizing the detection step with the phase modification step to automatically detect a spectrum for each phase modification.

In some embodiments, the wavelength of the counter-propagating light waves is in the range of visible light.

In some embodiments, the refractive index of the dielectric prism is between 2.5 and 4.6.

In some embodiments, the dielectric is a double-faceted prism.

In some embodiments, the two incident angles are selected such that the maximum spatial frequency of any one of multiple Fourier components of the detected spectrum is within a threshold determined as a function of a cutoff frequency $f_{cutoff}$ of a system optical transfer function.

In some embodiments, the function is given by $5*f_{cutoff}$.

There is provided, in accordance with an embodiment, a computer program product comprising a non-transitory computer-readable storage medium having program code embodied thereon, the program code executable by at least one hardware processor to: receive from a detector multiple low resolution detected images of an illuminated fluorescing object, wherein the fluorescing object is illuminated by an evanescent bi-periodic standing sinusoidal wave generated from a bi-periodic interference pattern of two standing sinusoidal waves propagating within a dielectric, wherein the bi-periodic interference pattern is caused by illuminating the dielectric with two pairs of counter-propagating light beams at different incident angles, wherein the incident angles are selected in accordance with the index of refraction of the dielectric prism to i) determine the spatial frequency of each counter-propagating sinusoidal light wave pair, and ii) cause total internal reflection, wherein each detected spectrum corresponds to a different initial phase of the two pairs of counter-propagating sinusoidal light waves; and process the multiple detected images into spectra to reconstruct a high resolution image of the object.

In some embodiments, the program code is further executable to control a modification of the initial phase of each of the two pairs of counter-propagating light waves by controlling one or more delay lines.

In some embodiments, the initial phases are modified such that each detected spectrum allows analyzing a different one of multiple Fourier components of the detected spectrum.

In some embodiments, the program code is further executable to synchronize the detector with the delay lines to automatically detect the emitted spectrum corresponding to each phase modification.

In some embodiments, the program code is further executable to select the incident angles such that the maximum spatial frequency of any one of multiple Fourier components of the detected spectrum is within a threshold determined as a function of a cutoff frequency $f_{cutoff}$ of a system optical transfer function.

In some embodiments, the function is given by $5*f_{cutoff}$.

In some embodiments, the program code is further executable to render the reconstructed image on a display.

There is provided, in accordance with an embodiment, a system for creating a super-resolved image, comprising: an optical apparatus configured to produce multiple distinct illumination beams each having a separately controlled phase shift; a slab comprising: a first face disposed with a diffraction grating arranged to be illuminated by the multiple distinct illumination beams and cause multiple interference patterns to form within the slab; a second face configured to support a fluorescent sample, wherein the slab is configured to produce from the multiple interference patterns multiple spatially modulated illumination intensities in a plane orthogonal to an observation axis at an interface between the slab and the fluorescent sample, and thereby illuminate the fluorescent sample; an objective positioned to collect light along the observation axis, and thereby collect light emitted from the illuminated fluorescent sample; a detector positioned to receive the collected light and create an image of the fluorescent sample; and a processor configured to received multiple images from the collector under varying illumination configurations and use the multiple images to construct a super-resolved image of the fluorescent sample.

In some embodiments, the optical apparatus comprises: a laser light source configured to produce coherent light; and a spatial light modulator (SLM) configured to receive coherent light from the laser and produce the multiple distinct illumination beams each having a separately controlled phase shift.

In some embodiments, the system further comprising an output interface configured to render the super-resolved image.

In some embodiments, the diffraction grating comprises multiple concentric circles each including multiple slit sets with a distinct periodicity, and wherein the slit sets are symmetrically arranged to align in a row across the slab.

In some embodiments, the slab is made of a high-index material.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 4A-4D illustrate an analysis of the results of FIGS. 3A-E in the Fourier domain, in accordance with an embodiment;

FIGS. 4E-4F show errors obtainable at intermediate frequencies, resulting from a single frequency illumination pattern, in accordance with an embodiment; and FIGS. 4G-4H show a reconstruction error when using bi-periodic sinusoidal illumination with a double frequency pattern, in accordance with an embodiment;

FIGS. 5A-5E illustrate a system for generating an evanescent standing wave, in accordance with another embodiment.

DETAILED DESCRIPTION

Figure 1B:
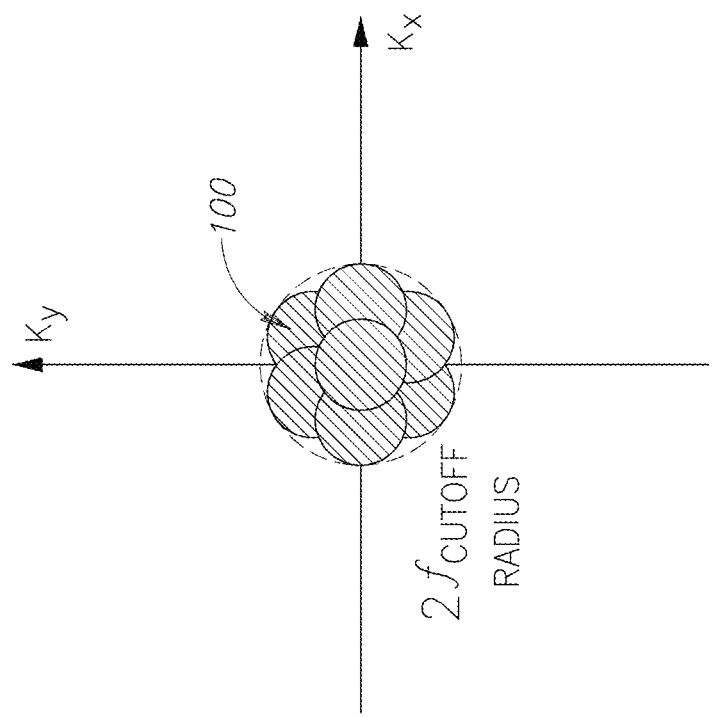
FIGS. 1A-1E illustrate resolvable spatial frequencies for structured illumination microscopy (SIM) using different illumination schemes, in accordance with an embodiment.

Disclosed herein is a method for improved resolution structured illumination microscopy (SIM) that images a sample using structured 'moire' pattern illumination. A low-loss, high-index dielectric may be used to create a coherent interference 'moire' pattern of multiple standing waves having wavelength ranges that are not damaging to biological tissue. The high-index dielectric material, such as Gallium Phosphide (GaP), may be selected to achieve total internal reflection (TIRF) upon illumination. For example, in one embodiment, light may illuminate the dielectric at incident angles greater than its critical angle, $\theta_C$. Thus, illuminating the dielectric by two or more pairs of counter-propagating waves at incident angles, $\theta_1$, $\theta_2 > \theta_C$, may result in two interfering standing waves. Incident angles $\theta_1$ and $\theta_2$ may be selected to control the spatial frequencies of the incoming light, which may reach as high as n times the spatial frequency otherwise attainable in free space, with n being the refractive index of the dielectric material. Additionally, the relative phases, $\varphi_1$ and $\varphi_2$, of the incoming light may be independently and/or dynamically controlled, such as by adding one or more delay lines to the optical paths of the light incoming to the dielectric, simplifying the reconstruction from multiple captured images.

The interference of the two standing waves within the illuminated dielectric may result in an evanescent standing wave having multiple distinct high spatial frequencies that may be used to illuminate an object placed on the surface of the dielectric, allowing super-resolution imaging in the order of 50 nanometers (nm) using standard SIM algorithms. Use of a high index material for the dielectric may allow for the recovery of high spatial frequencies, expanding the band of the recoverable frequencies and enhancing the resolution of the imaging system. Use of multiple simultaneously standing waves may provide the required spectral continuity for the optimal reconstructed image.

In one embodiment, a coherent interference pattern of two standing waves is generated from four distinct spatial frequencies having relative phases that are dynamically-controlled. The high refractive index of the dielectric allows attaining high spatial frequencies, and the illumination at multiple different angles allows attaining spectral continuity, that together, may improve resolution over conventional configurations. Furthermore, the loss-less TIRF configuration may simplify implementing this technique for fluorescent microscopy, allowing for improved resolution at high speed with wavelengths suitable for in vivo studies.

An implementation of this technique is described below.

A fluorescent sample may be illuminated with intensity $I_{ill}$, which may be described by the following sinusoidal:

$$I_{ill}(x) = I_0 \times [1 + \cos(2\pi f x + \varphi)] \quad (1)$$

Where f is the spatial frequency of the pattern, and $\varphi$ is the initial phase. Given a fluorophore density $\psi$, the light emitted from the sample, $I_{em}$, may be described as $I_{em} = \psi \times I_{ill}$, and the detected light may be described as $I_{det} = I_{em} \otimes PSF$, where PSF is the system point spread function of the detection system, and $\otimes$ denotes convolution. The Fourier transform of the detected intensity may thus be described as:

$$\tilde{I}_{det}(k) = \frac{1}{2} I_0 \times OTF \times [2\tilde{\psi}(k) + e^{i\varphi}\tilde{\psi}(k+2\pi f) + 2e^{-i\varphi}\tilde{\psi}(k-2\pi f)] \quad (2)$$

Where ~ denotes the Fourier transform and OTF is the system optical transfer function, and which is the Fourier transform of the PSF.

Reference is now made to FIGS. 1A-1E which together illustrate resolvable spatial frequencies for structured illumination microscopy (SIM), using different illumination schemes, in accordance with an embodiment.

Figure 1A:
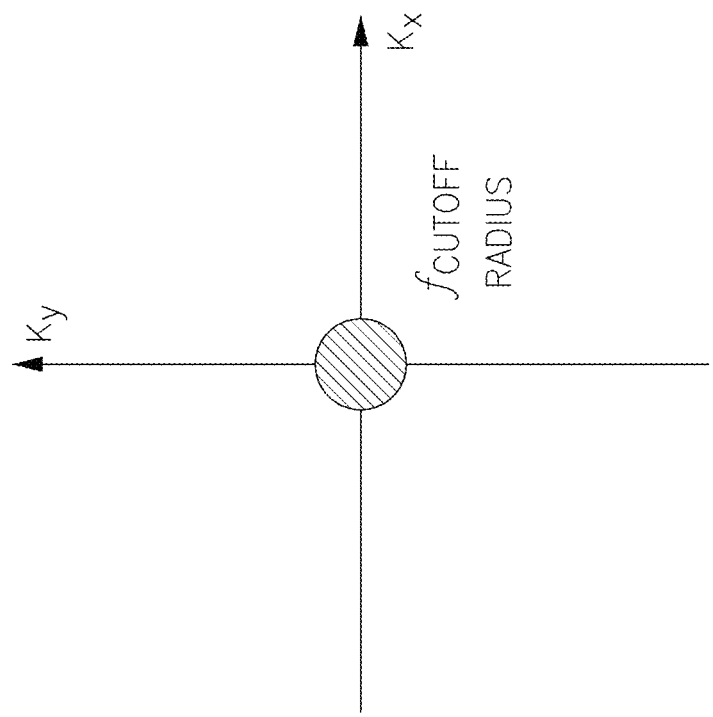

Referring to FIG. 1A, a typical passband of the OTF is described as a circular region around the origin of the Fourier plane and having a radius $f_{cutoff}$ corresponding to the maximal resolvable spatial frequency. Thus, under uniform illumination, any information corresponding to spatial frequencies above $f_{cutoff}$ is lost, limiting the resolution of standard fluorescent microscopy.

Referring to equation (2), the sinusoidal illumination results in the detected light $\tilde{I}_{det}$ having three Fourier spectrum components for the fluorophore density $\tilde{\psi}$: two shifted components and one unshifted component, and thus, high-frequency information, corresponding to the shifted components is folded into the passband of the OTF, and may be detected in the far-field. This characteristic may be leveraged as follows: a set of three images each having a different initial phase, given by $$\varphi_n = \frac{2\pi n}{3},$$

n=0, 1, 2, may be taken and used to reconstruct the complex $\tilde{\psi}$ at the multiple different frequencies originally included, and folded into the OTF passband, as illustrated by regions 100 in FIG. 1B. Illuminating the fluorescing sample sequentially with phase-shifted sinusoidal patterns (three for each direction) and from multiple different directions in the XY plane, such as between three to five directions, may allow reconstructing the Fourier spectra of the fluorophore density $\tilde{\psi}$ at frequencies up to $f_{max} = f_{cutoff} + f$, resulting in a high resolution two-dimensional image.

The resolution of a SIM system may be determined by the range of reconstructable frequencies in the Fourier spectrum. For an emitted light wavelength) $\lambda_{em}$ and numerical aperture NA of the detection system (e.g. an objective lens), this range depends on the cutoff frequency $f_{cutoff} \sim 2NA/\lambda_{em}$, and the illumination frequency, f.

In one embodiment, an illumination pattern may be created from the interference of light launched through an objective posing a maximal illumination spatial frequency limit of $f \sim 2NA/\lambda_{ill}$, where $\lambda_{ill}$ denotes the wavelength of the light illuminating the sample. Assuming $\lambda_{em} \approx \lambda_{ill}$, this may result in a maximal reconstructed frequency of $f_{max} \approx 2f_{cutoff}$, corresponding to a two-fold improvement in resolution.

Figure 1C:
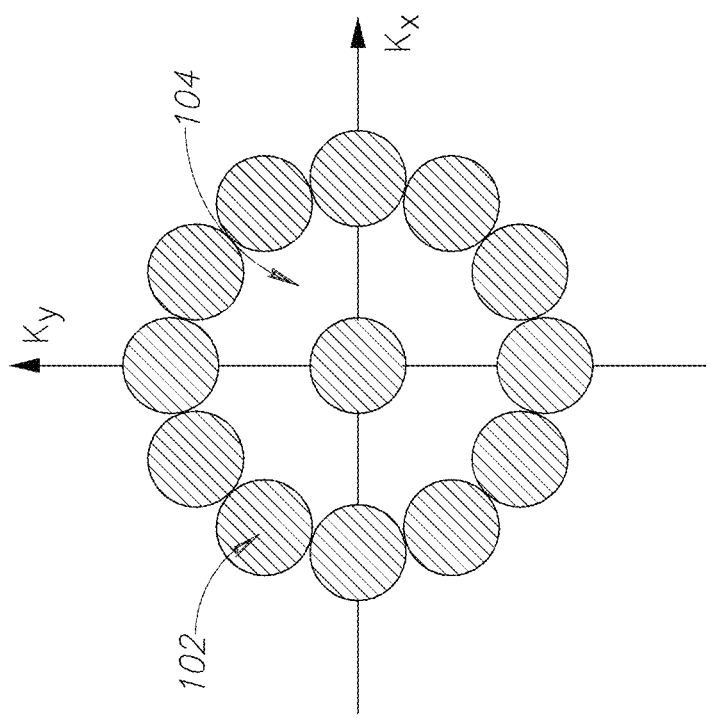

Referring to FIG. 1C, illuminating with shorter-period sinusoid patterns, or higher spatial frequencies, such as may be obtained using a high-index dielectric, near-field grating, or plasmonic modes, may allow information included in the higher frequencies to be folded into the passband of the OTF, indicated by circles 102. Each opposing pair of circles 102 corresponds to an illumination from a different orientation angle about the sample in the XY plane. However, for an illumination frequency $f > 3f_{cutoff}$, only the frequency range $[f - f_{cutoff}, f + f_{cutoff}]$ can be reconstructed, whereas the information at intermediate frequencies between $[f_{cutoff}, f - f_{cutoff}]$ indicated by gap 104, is not converted into the OTF passband, and is thus, lost, resulting in reduced image resolution. One solution to this may be to sequentially apply the method again from the start with a set of illumination wavelengths that each convert a different range of spatial frequencies into the OTF passband. However this solution carries a penalty of longer acquisition times, among other complexities.

Figure 1D:
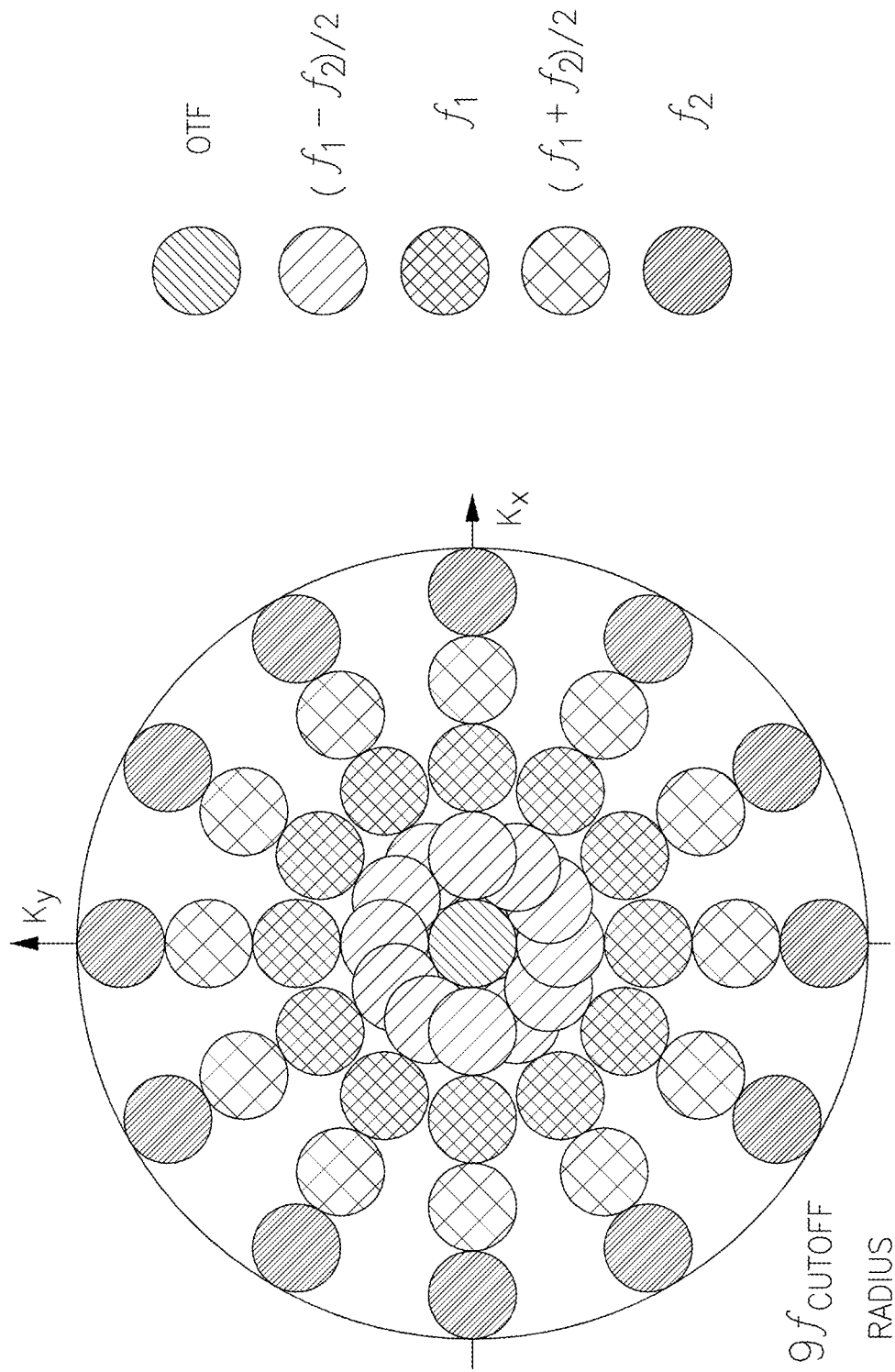
Figure 1E:
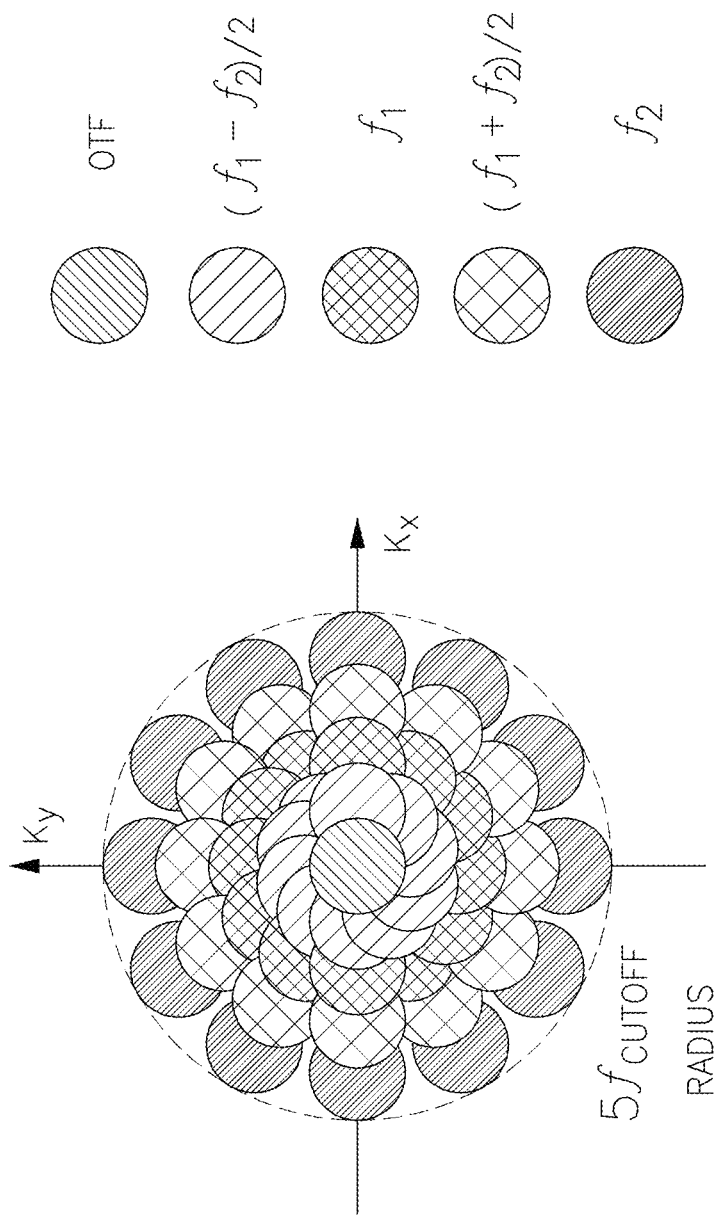

Conversely, referring to FIGS. 1D-1E, optionally, multiple acquisition spots may be acquired by varying the orientation of the incoming illumination as well as the phase of the incoming light. Each aligned row of acquisition spots corresponds to a different orientation for the illumination on the XY plane parallel to the surface plane of the dielectric supporting the sample, and each concentric ring of acquisition spots corresponds to different phases, $\varphi_1$ and $\varphi_2$ for the incoming illumination. Such a high spatial-frequency multi-periodic illumination pattern may allow simultaneous reconstruction in both high and intermediate spatial frequencies, which is described in greater detail hereinbelow.

The following technique describes using a standard, low-loss high-index dielectric material to attain multi-sinusoidal patterns having sufficient degrees of freedom and loss-less operation, allowing the reconstruction of a broad range of spatial frequencies required for super-resolution imaging.

A bi-sinusoidal illumination pattern may be described by:

$$I_{ill,bi}(x) = I_0 \times [2 + \cos(2\pi f_1 x + \varphi_1) + \cos(2\pi f_2 x + \varphi_2) + \cos(\pi(f_1+f_2)x+\varphi_1) + \cos(\pi(f_1+f_2)x+\varphi_2) + \cos(\pi(f_1-f_2)x) + \cos(\pi(f_1-f_2)x+\varphi_1-\varphi_2)], \quad (3)$$

where $f_1$, $f_2$ and $\varphi_1$, $\varphi_2$ are two different spatial frequencies and initial independent phases, respectively, and x is a time-domain variable. Hence, the Fourier transform representing the spatial frequencies k of the detected intensity $\tilde{I}_{det}$ may be described as:

$$\tilde{I}_{det,bi}(k) = I_0 \times OTF \times [2\tilde{\psi}(k) + \phi_a\tilde{\psi}(k+2\pi f_1) + \phi_a^*\tilde{\psi}(k-2\pi f_1) + \phi_b\tilde{\psi}(k+2\pi f_2) + \phi_b^*\tilde{\psi}(k-2\pi f_2) + \phi_c\tilde{\psi}(k+\pi(f_1+f_2)) + \phi_c^*\tilde{\psi}(k-\pi(f_1+f_2)) + \phi_d\tilde{\psi}(k+\pi(f_1-f_2)) + \phi_d^*\tilde{\psi}(k-\pi(f_1-f_2))],$$ (4)

where $\phi_i$, i=a, b, c, d are known functions of the initial phases $\varphi_1$, $\varphi_2$, and $\phi^*$ are the corresponding complex conjugates, and k is a frequency-domain variable.

Eq. 4 shows nine fluorophore Fourier spectrum components $\tilde{\psi}$ included in $\tilde{I}_{det}$: eight distinct shifted components, and one unshifted component, indicating that a spatial frequency range of up to four times larger than the cutoff frequency $f_{cutoff}$ may be folded into the OTF passband. Applying Eq. 4, a set of nine images each obtained under illumination with a different, independently modified phase may be used to reconstruct the complex $\tilde{\psi}$ at the multiple different frequencies originally included, and/or shifted into the OTF passband. In fact, Eq. 4 has nine unknowns terms $\tilde{\psi}$ which can be solved by taking nine separate measurements.

Theoretically, spatial frequencies at values of $f_1=4f_{cutoff}$, $f_2=8f_{cutoff}$ may enable reconstructing information at all frequencies up to $9f_{cutoff}$ as shown in FIG. 1D, and corresponding to a nine-fold improvement in resolution. However, achieving spatial frequencies in the order of $8f_{cutoff}$ is not trivial when using conventional optical materials that typically have a refractive index of up to 4 in the visible spectrum.

Referring to FIG. 1E, in one embodiment, an overlap, such as a 50% overlap, between the different frequency shifts may be imposed to allow recovering the Fourier spectrum in all directions with a smaller number of illumination rotations, and which may be applicable for use with conventional optical materials having a refractive index up to 4, and may ease the requirement of creating sinusoidal illumination patterns with spatial frequencies that exceed the refractive capabilities of conventional dielectrics. Such a bi-periodic illumination pattern may achieve a five-fold resolution improvement, as illustrated in FIG. 1E, and resulting in a resolution capability in the order of 50 nm.

It may be noted that the resolution of the multiple-periodic SIM scheme described above is primarily limited by the highest feasible illumination spatial frequency. Thus, any ultra-short wavelength modes that create sinusoidal patterns having frequencies above $8f_{cutoff}$ may be similarly applied to extend to higher periodic illuminations, such as triple-periodic illumination, quadruple-periodic and so on.

Figure 2A:
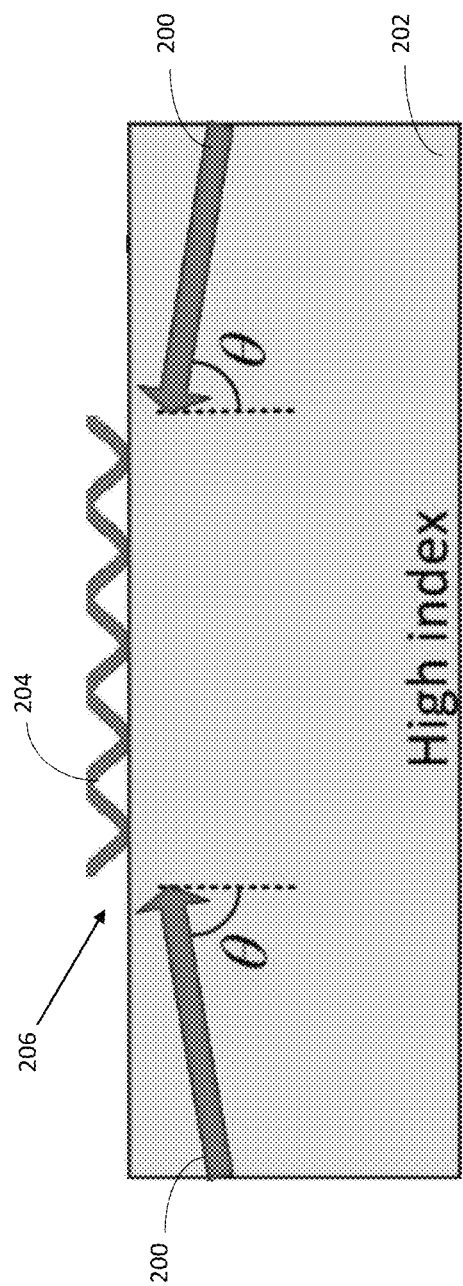
FIG. 2A illustrates a system for generating an evanescent standing wave, in accordance with an embodiment.

Reference is now made to FIG. 2A, which illustrates a system for generating an evanescent standing wave that may be used to illuminate a fluorescing object, in accordance with an embodiment. A pair of opposing light beams 200 may illuminate a high-index dielectric 202 at incident angle θ, where the refractive index of the dielectric $n_h$ and θ are selected to achieve TIRF, thereby causing a standing-wave pattern to form within the dielectric. This may cause an evanescent standing wave pattern 204 having a periodicity of $p_{TIRF}=\lambda_{ill}/(2n_h \sin \theta)$ to form on the interface between the high-index dielectric 202 and a low-index medium 206. Thus, the periodicity $p_{TIRF}$ may be up to $n_h$ times shorter than half the illumination wavelength $\lambda_{ill}$, and may be controlled by modifying the incidence angle θ.

Figure 2B:
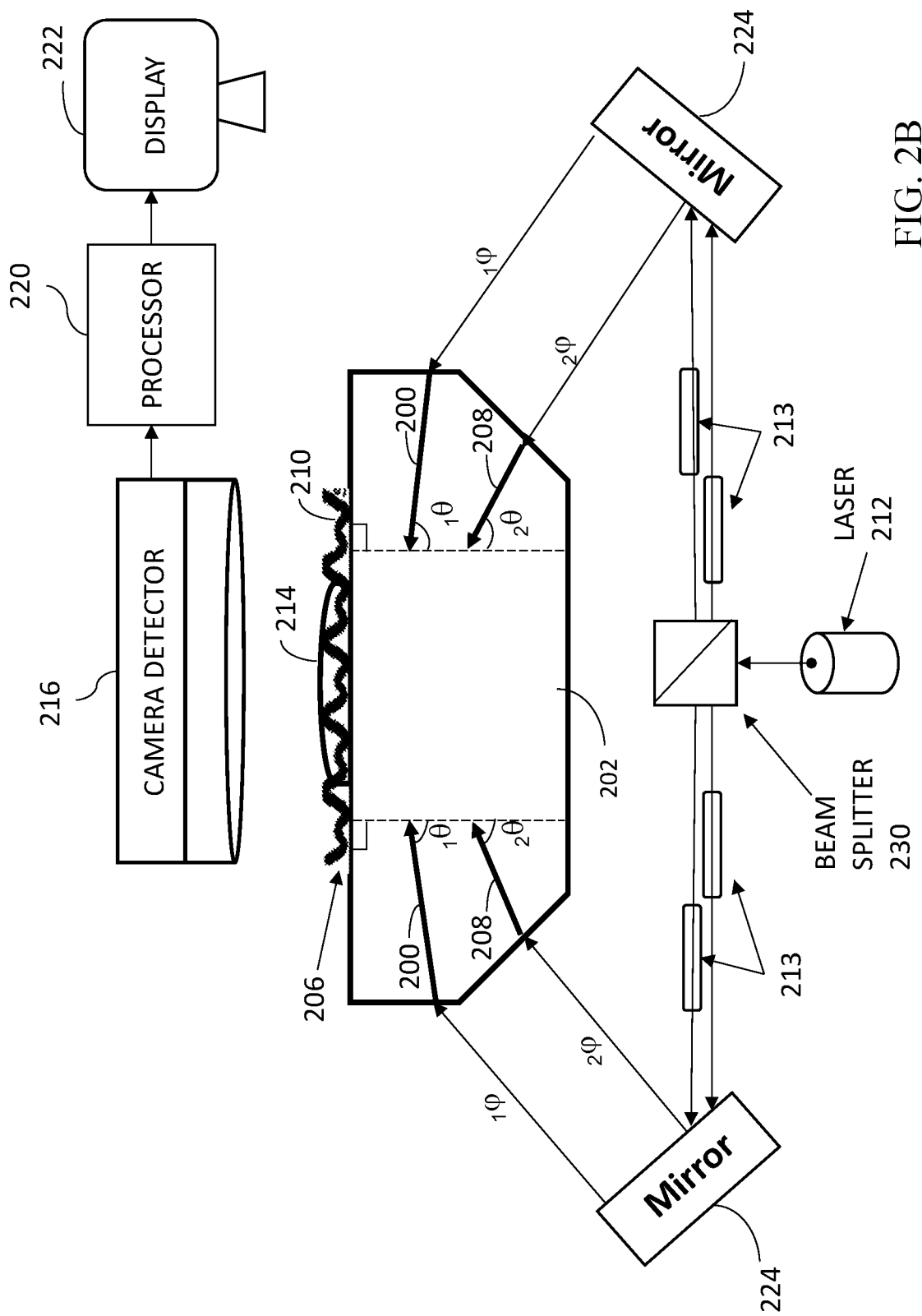
FIG. 2B illustrates a system for generating a bi-periodic evanescent standing wave, in accordance with an embodiment.

Reference is now made to FIG. 2B, which illustrates system for generating a bi-periodic evanescent standing wave that may be used to illuminate a fluorescing object, such as shown in FIG. 2A. A high-index dielectric 202 may be illuminated with two or more pairs of coherent light beams 200 and 208, each at a different incident angle, $\theta_1$, $\theta_2$ respectively.

The angles θ1,θ2 may be selected in accordance with the index of refraction of the high index dielectric 202, to determine the spatial frequencies f1 and f2 of each counter-propagating pair of two or more pairs of coherent light beams 200 and 208, and additionally, to cause total internal reflection. Thus, the illumination may result in the creation of a bi-periodic interference 'moire' pattern of two standing sinusoidal waves within the high index dielectric 202 having spatial frequencies f1 and f2. Optionally, the high index dielectric 202 may be a double faceted prism, allowing light source 212 to be a collimated light source. Optionally, one or more light sources 212 may be provided to produce two or more pairs of coherent light beams 200 and 208, and illuminate dielectric the high index 202 accordingly.

One or more delay lines 213 may be provided to independently modify the initial phases φ1,φ2 of each of the two or more pairs of coherent light beams 200 and 208, thereby providing a shift in the individual pattern created by each pair of the two or more pairs of coherent light beams 200 and 208 and in the final 'moire' pattern delay lines 213 may be integrated with light sources 212 via using a single Spatial Light Modulator, or may be configured separately using piezo electric mirrors 214. Optionally, beam splitter 230 may be provided to guide and/or focus and/or split the light beams.

The bi-periodic interference pattern may generate an evanescent bi-periodic standing sinusoidal wave pattern 210 to form at the interface between high-index dielectric 202 and low-index medium 206, such as at the surface of the high index dielectric 202, where the evanescent bi-periodic standing sinusoidal wave pattern 210 may have spatial frequencies f1 and f2, corresponding to incident angles θ1,θ2, and expressed as $$f_1 \sim \frac{2n_h \sin\theta_1}{\lambda_{ill}}, f_2 \sim \frac{2n_h \sin\theta_2}{\lambda_{ill}},$$

and also the cross contributions $(f_1+f_2)/2$ and $(f_1-f_2)/2$.

The evanescent bi-periodic standing sinusoidal wave pattern 210 may illuminate a fluorescing object 214 positioned within low-index medium 206, such as air on the surface of the high index dielectric 202. An camera detector 216 may be provided to collect the multiple low resolution images of the illuminated fluorescing object 214, where each detected low resolution images may correspond to a different modification of the initial phase by delay lines 213. A processor 220 may receive the multiple low resolution images from the camera detector 216, under varying phase shifted illumination schemes, and may process them into detected Fourier spectra to reconstruct a super-resolved image of the fluorescing object 214, and which may then be rendered on display 222.

Optionally, processor 220 may control delay lines 213 thereby controlling the independent phase modification of the initial phases, such that each spectrum detected by the camera detector 216 allows reconstructing the image as described above. Optionally, processor 220 may synchronize the phase modification by delay lines 213 with camera detector 216 to automatically detect a spectrum emitted by fluorescing object 214 for each modification of the initial phases. Additionally, processor 220 may select incident angles θ1,θ2 such that the maximum spatial frequency of any of the Fourier components, determined as a function of spatial frequencies f1 and f2, is within a threshold determined as a function of the cutoff frequency fcutoff of the OTF of the system, for example $5*f_{cutoff}$ as described above. Additionally, processor 220 may select incident angles θ1,θ2 in accordance with a computed spatial frequency overlap, to ensure that the maximum spatial frequency of any of the detected Fourier components is within the threshold.

In some embodiments, the wavelengths for the two or more pairs of coherent light beams 200 and 208 may range from 400 nanometers (nm) to 800 nm, with an error of ±10%. The refractive index of the high index dielectric 202 may range from 2.5 to 4.6, with an error of ±10%. Incident angles θ1,θ2 may range from 45° to 85° with an error of ±10%, numerical aperture NA may range from 0.6 to 1.5, with an error of ±10%. The high index dielectric 202 may comprise Gallium Phosphide (GaP), Silicon, TiO2, to name a few.

For example, a double-facet dielectric prism comprising of Gallium Phosphide (GaP) having a refractive index of 3.64 may be illuminated with light at wavelength $\lambda_0$=488 nm at incident angles $\theta_1$=30°, $\theta_2$=81°, and numerical aperture NA=0.9, which is typical for immersion-less microscopy, resulting in two spatial frequencies, $f_1$~$2f_{cutoff}$, $f_2$~$4f_{cutoff}$. According to Eq. 4 and FIG. 1E, this may enable a 5-fold resolution improvement, allowing resolution capability in the order of 50 nm.

It may be noted that GaP's absorption coefficient of ~0.2 μm$^{-1}$ may allow for substantially regular illumination patterns in a field of view in the order of 10 micrometers (μm)×10 μm, with an error of ±10%. In general, using this realization with a high-index material of refractive index $n_h$ may enable a resolution of $\sim\lambda/[2\times(NA+n_h)]$ whereas the resolution of a standard microscopy is $\sim\lambda/[2\times NA]$. Hence the resolution enhancement of multi-periodic SIM may exceed resolutions attained using standard microscopy by an order of $n_h/NA+1$, bringing it to the resolution regime of STED and PALM, while maintaining the speed, wide-field and low-intensity advantages of standard microscopy.

Thus, using the technique described above, a high spatial frequency bi-periodic sinusoidal pattern may be created without relying on the use of lossy short-wavelength modes. Furthermore, the spatial frequencies may be individually controlled by independently selecting the multiple angles of incidence for the incoming illumination. Since the quality of the reconstructed imaging is dependent on the spatial frequencies, selecting the incident angles to thereby control, or tune, the spatial frequencies may provide improved resolution as compared with techniques that don't provide similar tuning capability. This contrasts with conventional techniques, such as using plasmodic modes on thin metal films, where one parameter typically determines all the spatial frequencies.

Additionally, separate, and/or independent control of the initial phases, $\varphi_1$, $\varphi_2$, of the incoming illumination allows image reconstruction in bi-periodic SIM. Since reconstruction processes, such as described in J. T. Frohn, H. F. Knapp, and A. Stemmer, '*Proceeding of the National Academy of Sciences*', 97, 7232 (2000), typically requires solving a set of nine equations of the form of Eq. 4, corresponding to nine acquired images, solving such a system may be simplified if the set of vectors $\{v_n\}_{n=1}^9$ is linearly independent, where $$v_n \equiv (1, \phi_{a,n}, \phi_{a,n}^*, \phi_{b,n}, \phi_{b,n}^*, \phi_{c,n}, \phi_{c,n}^*, \phi_{d,n}, \phi_{d,n}^*) \quad (5)$$

and n is the image number. The addition of one or more delay lines to the optical path of the incident lightwaves may provide a relatively simple and effective means to meet this independence requirement for realizing multi-periodic high-resolution SIM.

Reference is now made to FIGS. 3A-3E, which simulated results of multiple image reconstruction schemes, in accordance with an embodiment.

Figure 3B:
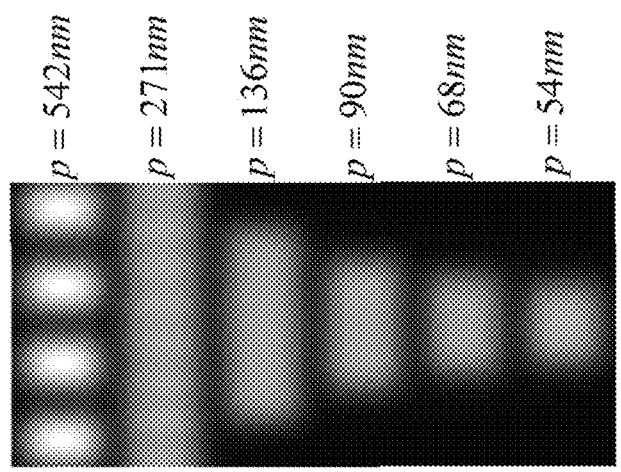
FIGS. 3A-3E together show simulated results of multiple image reconstruction schemes, in accordance with an embodiment.
Figure 3A:
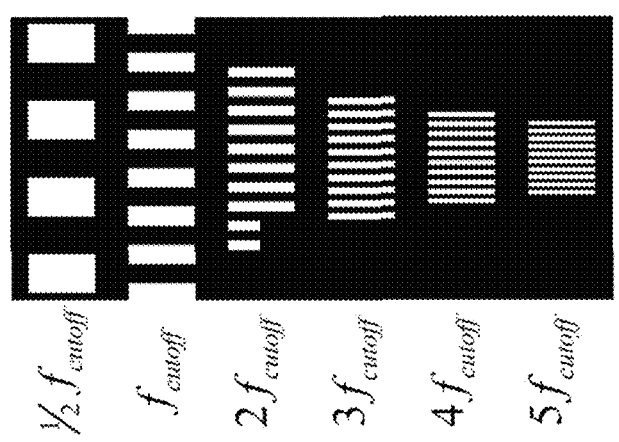

FIG. 3A shows a sample comprising six periodic square patterns with ascending spatial frequencies illuminated by a single or double period sinusoidal pattern created using light having wavelength $\lambda_0$=560 nm passing through a GaP dielectric and convolved with a standard (band limited) PSF to account for the spatial-frequency cutoff of waves propagating in free-space.

FIG. 3B shows a simulated reconstruction of the samples of FIG. 3A illuminated under uniform illumination and corresponding to standard far-field imaging. The results of this simulation correspond to those indicated in FIG. 1A, namely, only spatial frequencies under $f_{cutoff}$ are resolvable. The frequency indication for FIG. 3A and wavelength indication for FIG. 3B are intended to apply for each of FIGS. 3A-3B.

Figure 3E:
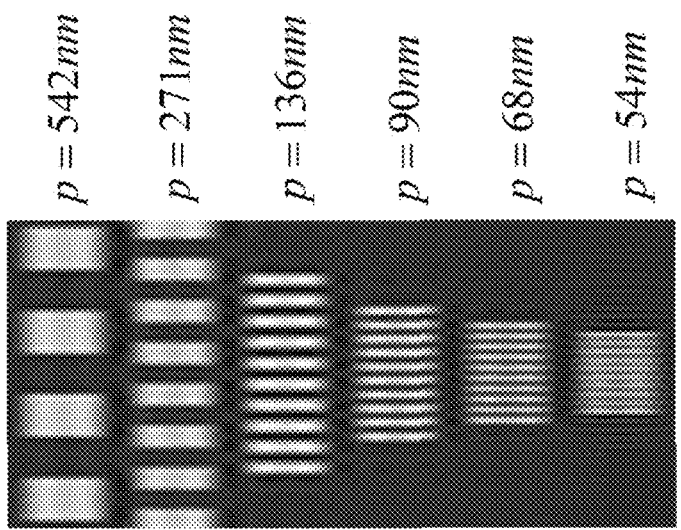
Figure 3D:
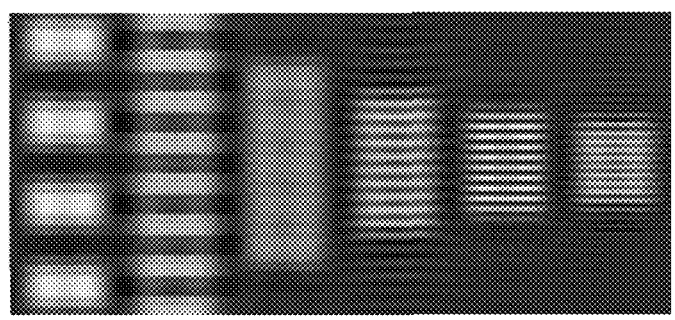
Figure 3C:
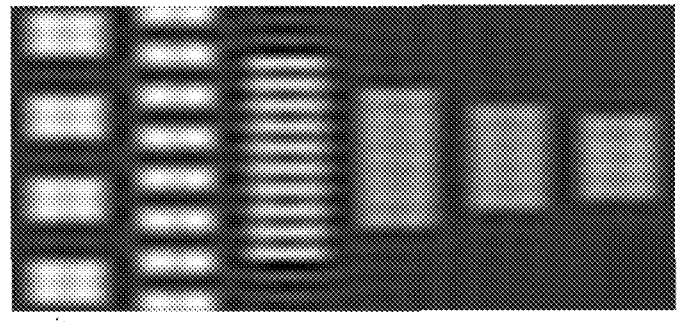

FIG. 3C shows a simulated reconstruction of the samples of FIG. 3A using three images illuminated with a single period sinusoidal pattern having spatial frequency $f=f_{cutoff}$. As can be seen from FIG. 3C, acquiring three images of the samples under illumination at a different initial phase for each image allows resolving spatial frequencies at up to $2f_{cutoff}$, as indicated in FIG. 1B.

FIG. 3D shows a simulated reconstruction of the samples of FIG. 3A using a sinusoidal illumination pattern with $f=4f_{cutoff}$. Although this illumination scheme allows resolving higher spatial frequencies, intermediate frequencies are left unresolvable and artifacts appear in the image, corresponding to the unresovable gap 104 indicated in FIG. 1C.

FIG. 3E shows a simulated reconstruction of the samples of FIG. 3A using a bi periodic high frequency illumination pattern with $f_1$=$2f_{cutoff}$, $f_2$=$4f_{cutoff}$. Nine images of the samples were acquired, each under illumination at a different initial phase as controlled by the delay lines, and which allowed reconstruction of high and intermediate spatial frequencies, corresponding to that indicated in FIGS. 1D-1E, and resulting in a high quality 50 nm super-resolution image. The frequency indication for FIG. 3C and wavelength indication for FIG. 3E are intended to apply for each of FIGS. 3C-3E.

Reference is now made to FIGS. 4A-4D which illustrate an analysis of the results of FIGS. 3A-3E in the Fourier domain. Referring to FIGS. 4A-4B, the magnitude and phase of the Fourier transform of the square patterns of FIG. 3A are shown. FIGS. 4C-4D depict the reconstruction error on a logarithmic scale for a single $f=f_{cutoff}$ frequency illumination pattern, where the substantially high reconstruction quality is obtained up to a spatial frequency of $2_{cutoff}$.

FIGS. 4E-4F indicate on a logarithmic scale errors obtainable at intermediate frequencies, resulting from a single frequency illumination pattern with $f=4f_{cutoff}$.

Reference is now made to FIGS. 4G-4H, which show the reconstruction error on a logarithmic scale when using bi-periodic sinusoidal illumination with a double frequency pattern, $f_1$=$2f_{cutoff}$, $f_2$=$4f_{cutoff}$. When illuminating with a double frequency pattern, the Fourier plane may be fully reconstructed with high quality resolution for spatial frequencies up to $5f_{cutoff}$. This may lead to a 5-fold resolution improvement in the final image, such as indicated as seen in FIG. 3E.

Thus, utilizing high-index dielectric materials to generate bi-periodic sinusoidal illumination patterns may substantially increase the range of spatial frequencies that can be reconstructed, resulting in a high quality super-resolution image. Furthermore, the system disclosed herein may be tunable using controllable delay lines, to allow independent control over the initial phases of each standing wave, and enable image reconstruction.

Reference is now made to FIGS. 5A-5E which together illustrate a system for generating an evanescent standing wave, in accordance with another embodiment. In the system of FIGS. 5A-5E, a diffraction grating together with a spatial light modulator (SLM) may be used to produce the interference pattern, in place of the delay lines and the double faceted prism of FIGS. 2A-2B.

Figure 5A:
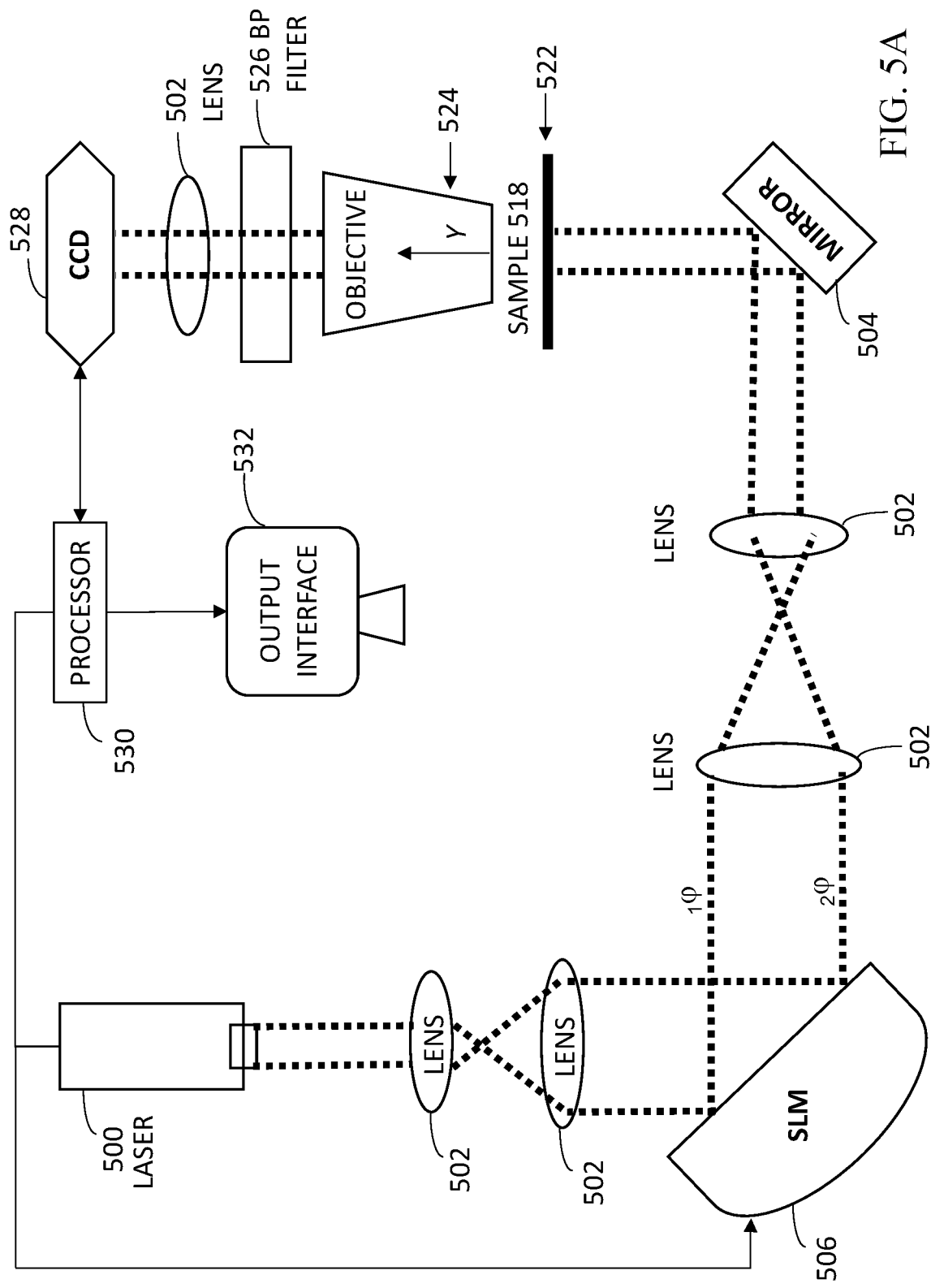

Referring to FIG. 5A, a light source, such as a laser 500 may be provided to produce coherent illumination. One or more lenses 502 and/or mirrors 504 and/or beam splitters (not shown) may be provided to perform any of: guiding, splitting, focusing the coherent illumination light towards a spatial light modulator (SLM) 506 that may use the coherent illumination light to generate and/or control multiple distinct illumination beams each having a separately controlled phase shift $\varphi_1$, $\varphi_2$. One or more lenses 502 and/or mirrors 504 and/or beam splitters (not shown) may be provided to guide and/or focus and/or split the multiple distinct illumination beams onto a diffraction grating layout 522, or to a prism layout, provided on a lower face of a slab 520, described in greater detail below with respect to FIGS. 5D-5E.

Figure 5B:
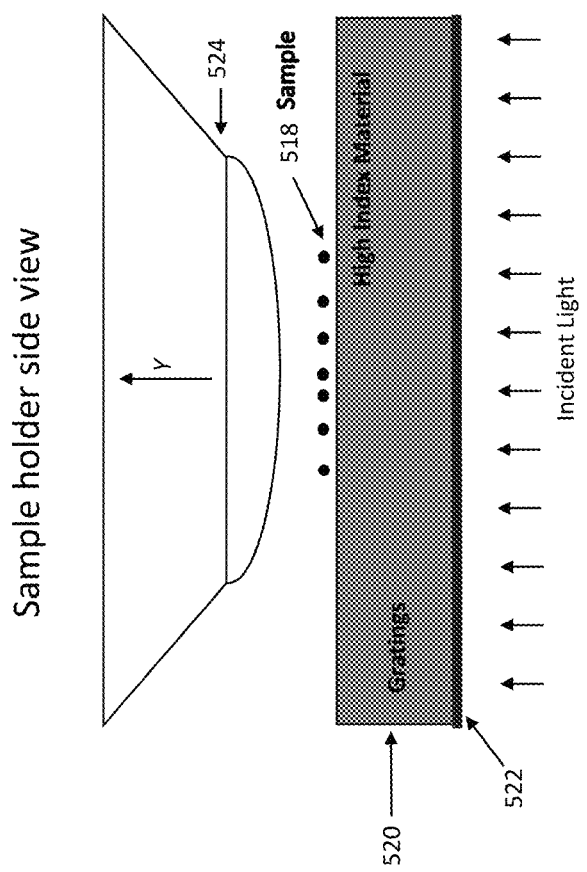

Referring to FIG. 5B, a zoomed-in side view of slab 520 is shown. Slab 520 may be made from a high index material, such as described above with respect to the high index dielectric 202. Diffraction grating layout 522 may be designed to cause multiple interference patterns to form within high index slab 520 from the multiple distinct illumination beams comprising the incident light. The multiple interference patterns may produce multiple spatially modulated illumination intensities in a plane orthogonal to the observation axis Y on the interface between the grating slab 520 and a fluorescing sample 518 that may be supported on an upper supporting face of slab 520, opposite to diffraction grating layout 522. Fluorescing sample 518, which may have similar properties to fluorescing object 214 described above, may be illuminated by the multiple spatially modulated illumination intensities and emit a fluorescent light signal towards and objective 524. Objective 524 may be made of a high NA material, and may be positioned to collect light long the observation axis Y to collect light emitted from fluorescing sample 518.

Referring back to FIG. 5A, the collected light may pass through a band pass filter 526 that may separate the fluorescent signal of the collected light from any background signal that may be present. The separated fluorescent signal may pass 5 through a lens 502 to a charge coupled device (CCD) camera 528 that may be provided to create an image from the filtered fluorescence signal, and provide the image to a processor 530. Processor 530 may be configured as above to receive multiple images from the charge-coupled device (CCD) camera 528 produced under varying illumination by SLM 506 and construct a super-resolved image of fluorescing sample 518 which may be rendered on an output interface 532.

Reference is now made to FIG. 5C, which shows a conceptual block diagram of SLM 506. SLM 506 may include any combination of: one or more of digital mirror devices 508, an electro optical modulator 510, a liquid crystal modulator 512, and an opto-mechanical modulator 514 that may be collectively controlled by a processor 516, and may together operate as a dynamic mask to modify the incoming light emitted by laser 500 to produce multiple distinctly phase-shifted illuminations, such as having phase shifts $\varphi 1, \varphi 2$, that may be directed towards diffraction grating layout 522. As described above, in some embodiments, processor 530 may control one or more components of the optical apparatus, such as any of laser 500, SLM 506 and/or the charge-coupled device (CCD) camera 528, to control the properties of the incident light and the timing for capturing images of the subsequently illuminated fluorescing sample 518. For example, processor 530 may synchronize the illumination by laser 500 with the capturing by the charge-coupled device (CCD) camera 528 while modifying one or more phase properties of the incident light by controlling SLM 506.

Figure 5D:
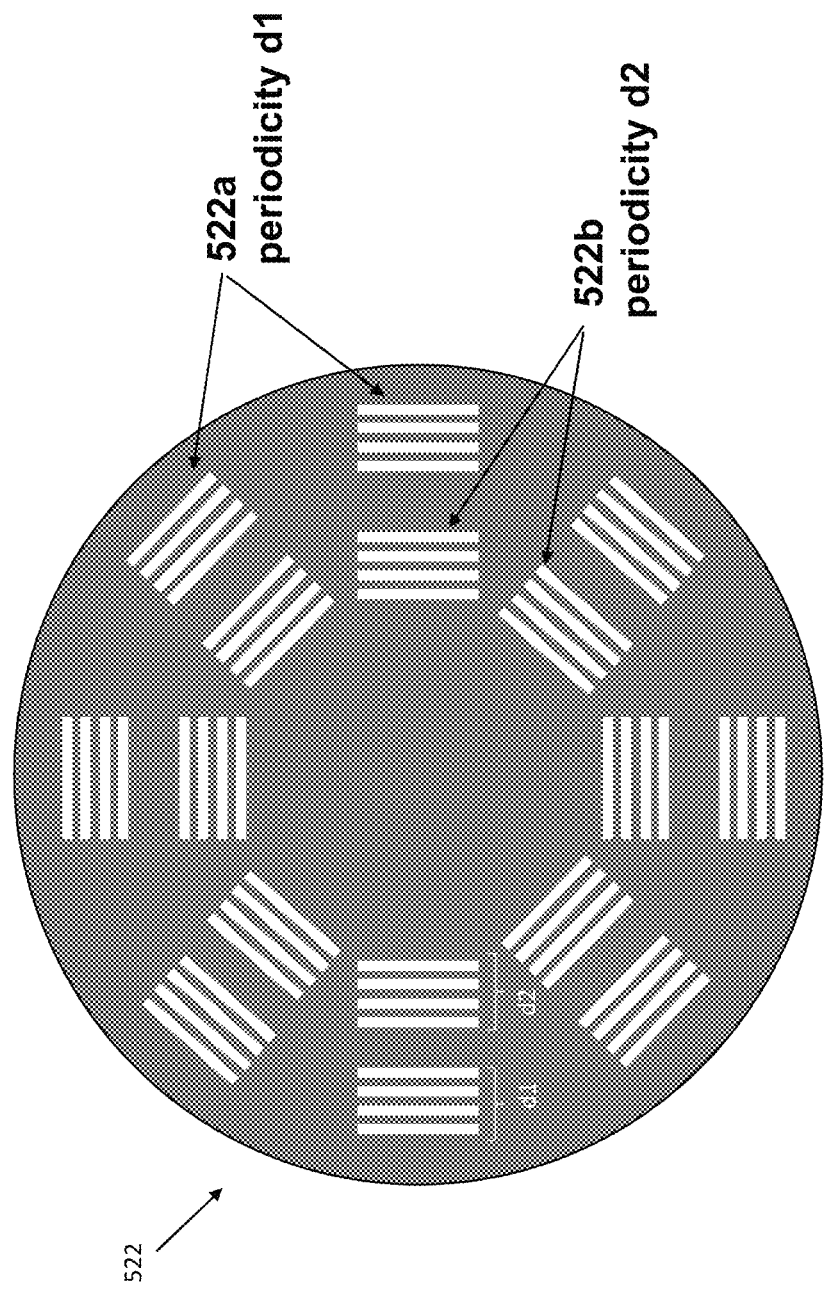
Figure 5E:
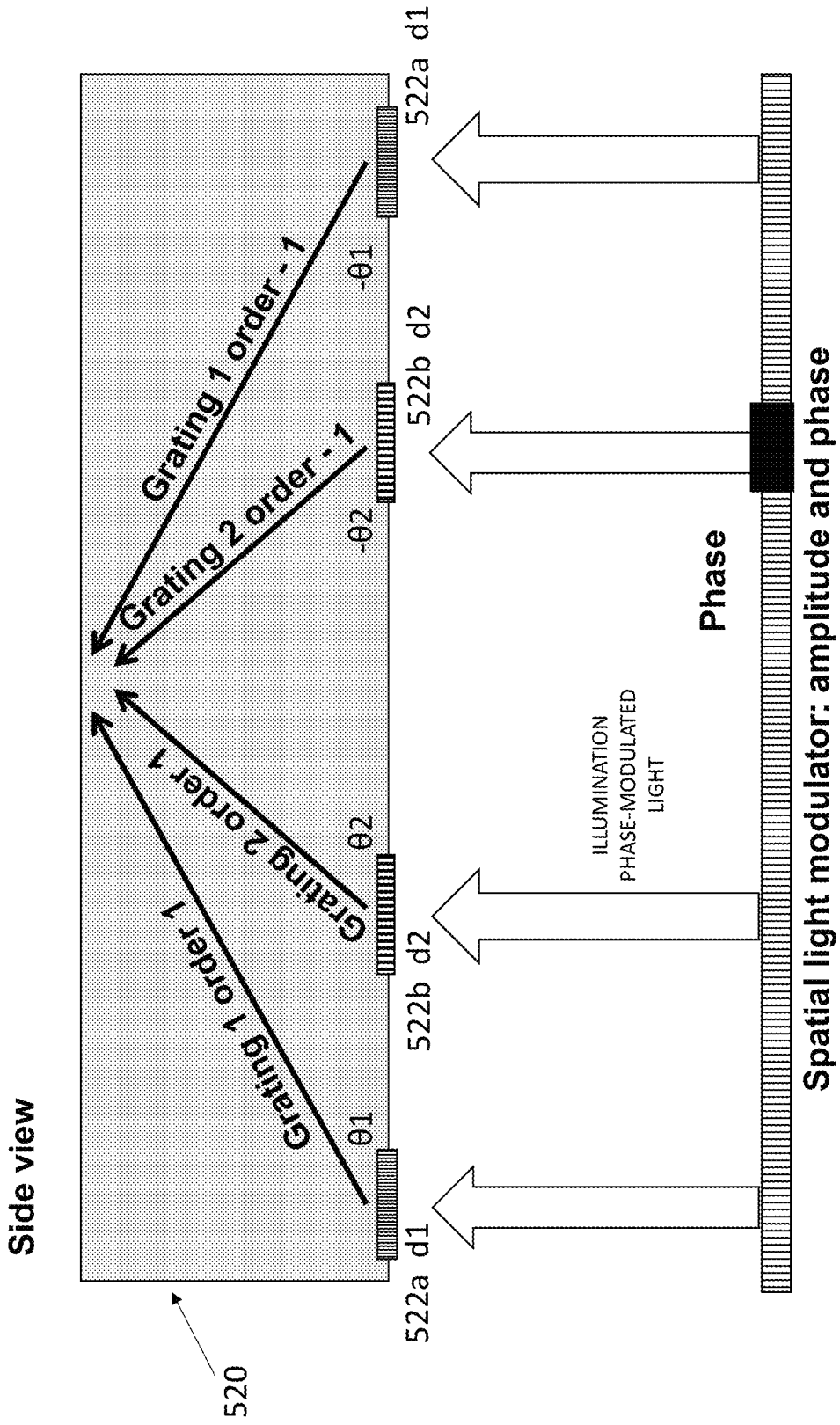

Referring to FIGS. 5D-5E, bottom face and side views for the diffraction grating layout 522 with slab 520, respectively, are shown. The diffraction grating layout 522 may comprise multiple concentric circles each including multiple slit sets with a distinct periodicity. For example, the diffraction grating layout 522 may include an outer circle of 8 slit-sets 522a, each slit set 522a having four slits each with a periodicity d1, and an inner circle of 8 slit-sets 522b, each slit set 522b having four slits each with a periodicity d2. Slit sets 522a and 522b may be arranged symmetrically such that opposite pairs of slit sets 522a and 522b align, to create a symmetric row of grating patterns having alternating periodicity d1-d2-d2-d1 across the bottom face of grating slab 520. Thus, the diffraction grating layout 522 may comprise eight copies of this symmetric row rotated about the midpoint, to produce the two concentric circles of slit sets 522a and 522b arranged about the lower face of slab 520, and that may create an interference pattern upon illumination from eight different incoming angles rotated about a plane parallel to the lower face of slab 520. For example, illuminating along any one of the grating pattern rows while varying the phases of the incident light via SLM 506 may result in a corresponding row of acquisition points such as shown in FIGS. 1D-1E. It may be appreciated that this pattern is meant to be exemplary only, and thus not limiting in any way, and other suitable patterns for creating interference patterns may be used.

Figure 6:
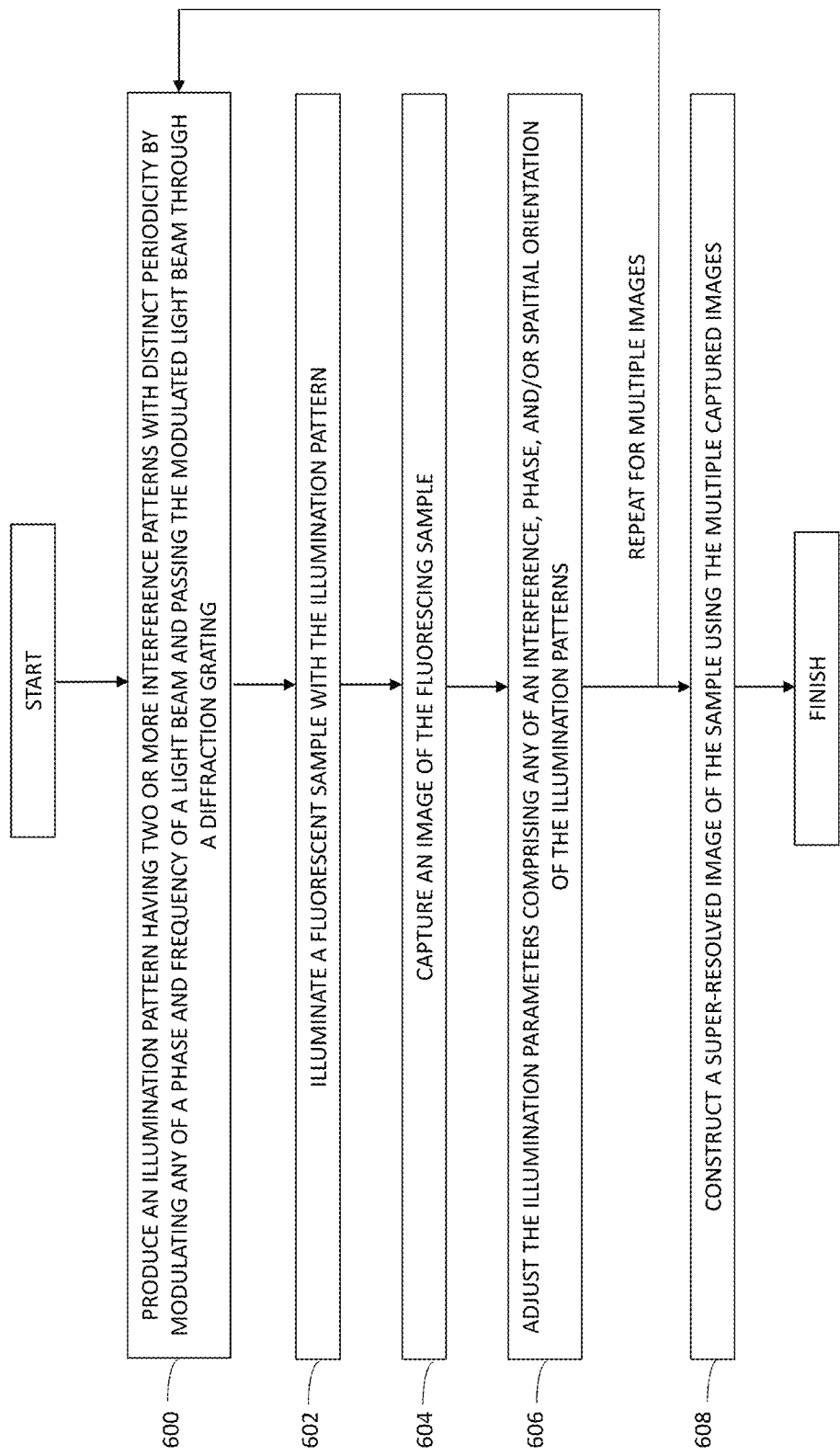
FIG. 6 shows a flowchart of a method for imaging a sample using the system of FIGS. 5A-5E.

Reference is now made to FIG. 6, which shows a flowchart of a method for imaging a sample using the system of FIGS. 5A-5B. Light may be phase and frequency modulated and directed through a diffraction grating to produce two or more illumination interference patterns with distinct periodicity (Step 600). A fluorescing sample may be illuminated using the illumination interference patterns (Step 602). Multiple images of the illuminated sample may be captured under differing illumination parameters comprising any of: interference, phase, and/or spatial orientations of the illumination interference patterns (Step 604) while adjusting the illumination parameters accordingly between each image (Step 606). A super resolved image of the sample may be reconstructed from the capture images (Step 608).

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system comprising:
   a dielectric configured to:
   a) create a bi-periodic interference pattern of two standing sinusoidal waves on an illumination by two pairs of counter-propagating sinusoidal light beams at different incident angles, wherein the different incident angles are selected in accordance with an index of refraction of the dielectric to i) determine a spatial frequency of each pair of counter-propagating sinusoidal light beams of the two pairs of counter-propagating sinusoidal light beams, and ii) cause a total internal reflection, and b) generate, from the bi-periodic interference pattern, an evanescent bi-periodic standing sinusoidal wave;

an optical apparatus configured to produce the two pairs of counter-propagating sinusoidal light beams and illuminate the dielectric at the different incident angles, and thereby illuminate a fluorescing object positioned at a surface of the dielectric with the generated evanescent bi-periodic standing sinusoidal wave; and one or more delay lines configured to independently modify an initial phase of each pair of counter-propagating sinusoidal light beams, to generate one or more modified initial phases.

2. The system of claim 1, further comprising:

a detector configured to detect multiple low resolution images of the illuminated fluorescing object, wherein each image of the multiple low resolution images corresponds to a different one of the one or more modified initial phases; and a processor configured to process the multiple low resolution images into spectra and reconstruct a high resolution image of the fluorescing object.

3. The system of claim 2, further comprising a display configured to render the reconstructed high resolution image.

4. The system of claim 2, wherein the detector is synchronized with the one or more delay lines to automatically detect an emitted spectrum from said fluorescing object for each of said one or more modified initial phases.

5. The system of claim 4, wherein the processor is further configured to: control the one or more delay lines, thereby controlling the one or more modified initial phases, and synchronize said detector with said one or more delay lines.

6. The system of claim 4, wherein the processor is configured to select the different incident angles, such that a maximum spatial frequency of any one of multiple Fourier components of the detected emitted spectrum is within a threshold of $5*f_{cutoff}$, where $f_{cutoff}$ is a cutoff frequency of the system's optical transfer function.

7. The system of claim 1, wherein a wavelength of the two pairs of counter-propagating sinusoidal right beams is in a range of visible light.

8. The system of claim 1, wherein the index of refraction of the dielectric is between 2.5 and 4.6.

9. The system of claim 1, wherein the dielectric comprises a double-faceted prism.

10. A method comprising:

selecting two incident angles in accordance with an index of refraction of a dielectric to i) determine a spatial frequency of each of two pairs of counter-propagating sinusoidal light beams, and ii) cause a total internal reflection on illuminating the dielectric with the two pairs of counter-propagating sinusoidal light beams at the two incident angles;

illuminating the dielectric with the two pairs of counter-propagating light beams at the selected two incident angles, thereby creating a bi-periodic interference pattern comprising two standing sinusoidal waves at the spatial frequency of each of two pairs of counter-propagating sinusoidal light beams, wherein the dielectric is configured to generate from the bi-periodic interference pattern an evanescent bi-periodic standing sinusoidal wave at a surface of the dielectric;

illuminating a fluorescing object with the evanescent bi-periodic standing sinusoidal wave; and independently modifying an initial phase of each pair of counter-propagating sinusoidal light beams of the two pairs of counter-propagating sinusoidal light beams, to generate one or more modified initial phases.

11. The method of claim 10, further comprising:

detecting multiple low resolution images emitted from the illuminated fluorescing object, wherein each image of the multiple low resolution images corresponds to a different one of the one or more modified initial phases; and processing the multiple low resolution images into spectra to reconstruct a high resolution image of the fluorescing object.

12. The method of claim 11, further comprising displaying the reconstructed high resolution image.

13. The method of claim 11, further comprising synchronizing the detecting with the modifying to automatically detect a spectrum for each of said one or more modified initial phases.

14. The method of claim 11, wherein selecting the two incident angles comprises selecting the two incident angles such that a maximum spatial frequency of any one of multiple Fourier components of spectra emitted from the illuminated fluorescing object is within a threshold determined as a function of a cutoff frequency $f_{cutoff}$ of a system optical transfer function.

15. The method of claim 14, wherein the function is given by $5*f_{cutoff}$.

16. The method of claim 10, wherein a wavelength of the two pairs of counter-propagating sinusoidal light beams is in a range of visible light.

17. The method of claim 10, wherein the index of refraction of the dielectric is between 2.5 and 4.6.

18. A computer program product comprising a non-transitory computer-readable storage medium having program code embodied thereon, the program code executable by at least one hardware processor to:

select two incident angles in accordance with an index of refraction of a dielectric to i) determine a spatial frequency of each of two pairs of counter-propagating sinusoidal light beams, and ii) cause a total internal reflection on illuminating the dielectric with the two pairs of counter-propagating sinusoidal light beams at the two incident angles;

illuminating the dielectric with the two pairs of counter-propagating light beams at the selected two incident angles, thereby creating a bi-periodic interference pattern comprising two standing sinusoidal waves at the spatial frequency of each of two pairs of counter-propagating sinusoidal light beams, wherein the dielectric is configured to generate from the bi-periodic interference pattern an evanescent bi-periodic standing sinusoidal wave at a surface of the dielectric;

illuminate a fluorescing object with the evanescent bi-periodic standing sinusoidal wave;

receive from a detector multiple low resolution images of the illuminated fluorescing object; and process the multiple low resolution images into spectra to reconstruct a high resolution image of the fluorescing object.

19. The computer program product of claim 18, wherein the program code is further executable by the at least one hardware processor, to modify an initial phase of each of the two pairs of counter-propagating sinusoidal light beams by controlling one or more delay lines.

\* \* \* \* \*